May 30, 1967 G. A. PERSSON 3,322,170
GANG SAWS
Filed March 19, 1965 3 Sheets-Sheet 3
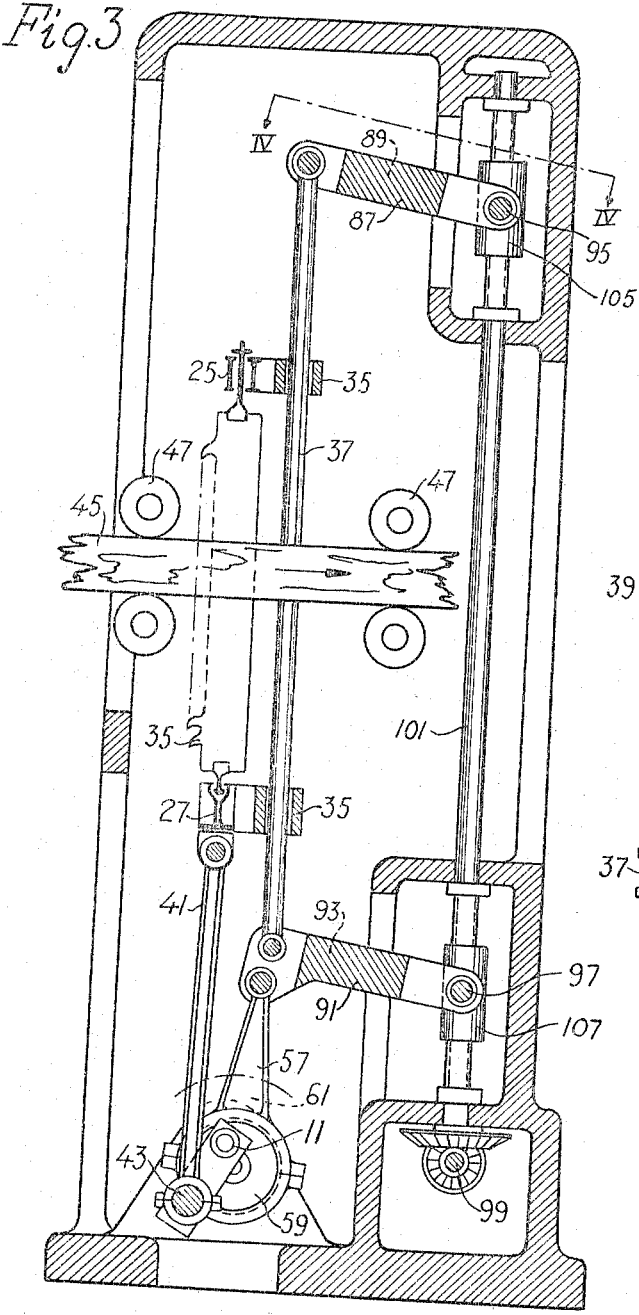
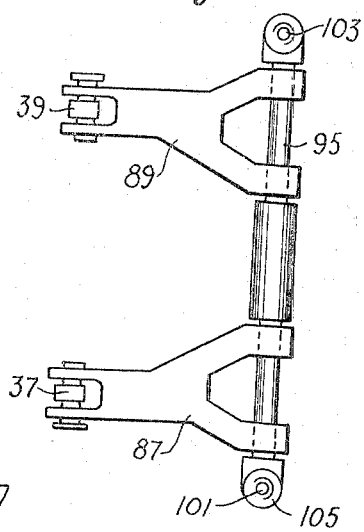
Inventor
Gustaf Adolf Persson
By Cushman, Darby & Cushman
Attorneys

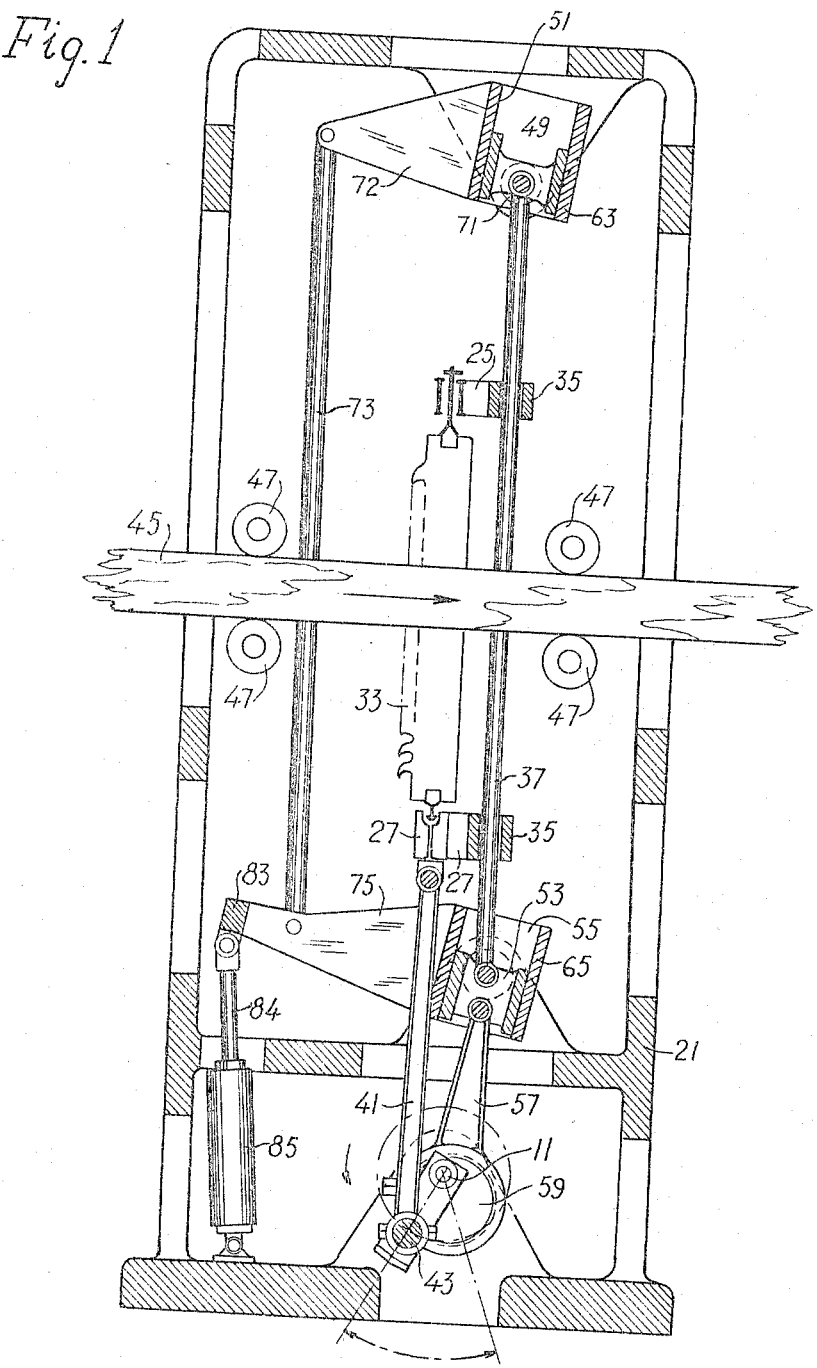

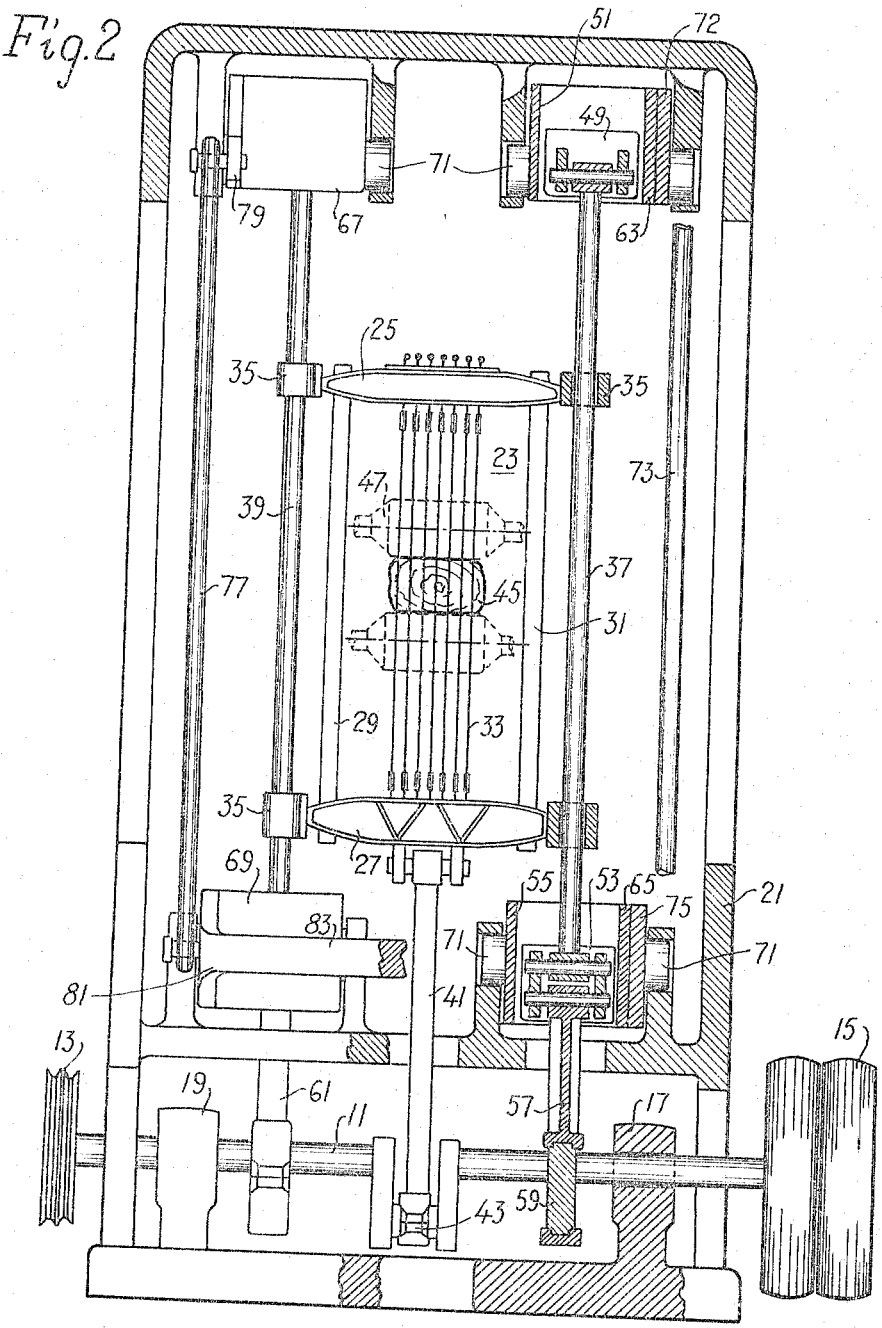

United States Patent Office 3,322,170
Patented May 30, 1967

3,322,170
GANG SAWS
Gustaf Adolf Persson, Per Hallstroms vag 2,
Nacka, Sweden
Filed Mar. 19, 1965, Ser. No. 441,251
12 Claims. (Cl. 143—81)

In a gang saw, horizontally fed timber is cut by saw blades fastened in a sash which is vertically reciprocated by a crank drive. In order to avoid that the continuously fed timber is pressed against the saw blades also during their inactive upward return stroke, it has been proposed to guide the sash by means of a sash guiding system arranged to perform a parallel motion having a horizontal component, whereby the sash, when approaching its lower turning point, is moved slightly in the direction of feed of the timber.

The invention relates to a gang saw of said known kind and has for its object to effect the desired composite movement of the saw-blades supporting sash by means of simple and powerful mechanisms affording rigidity of the movements and safeguarding an accurate and power-saving sawing operation.

The essential characterizing feature of the invention whereby said object is reached, consists in that the sash guiding system is driven by means of a crank and pitman drive directly from the main drive shaft in a substantially vertical reciprocating motion that is phase-displaced relatively to the vertical reciprocating motion of the saw sash, and in that the sash guiding system in its turn is guided in a path which is mainly vertical but forms a comparatively small angle to the path in which the sash guiding system guides the sash. The small angle difference between the two guiding paths has kind of a wedging effect, due to which the vertical motion of the sash guiding system gives rise to a horizontal motion considerably smaller and therefore performed with an amplified force, which horizontal motion is transferred to the saw sash. The phase displacement between the two crank-driven motions involves that the resulting composite motion of any point of the saw sash obtains the approximate shape of a vertically elongated and somewhat oblique ellipse.

Further characteristics of the invention will be evident from the following description of two preferred embodiments of the invention, reference being had to the accompanying drawings.

FIG. 1 is a lateral elevational view of a first embodiment, partly shown in vertical section. FIG. 2 is a front elevational view, likewise partly shown in vertical section. FIG. 3 is a lateral elevational view of a second embodiment, partly shown in vertical section. FIG. 4 is a top plan view taken from the line IV—IV in FIG. 3 and showing some details.

Referring to the sawing machine shown in FIGS. 1 and 2, the numeral 11 designates a main drive shaft carrying a belt pulley 13 and a flywheel 15. The shaft 11 is journalled in bearings 17, 19 rigidly secured to the lower part of the supporting structure 21 of the sawing machine. Said structure comprises an exterior stationary framework, in which a sash or frame 23 is enclosed and movably guided. Said sash consists of an upper cross beam 25, a lower cross beam 25 and lateral stiles 29, 31. Vertical saw blades 33 are braced in said sash parallelly to each other. At its four corners the sash 23 is provided with guiding sleeves 35 sliding upon two vertical columns 37, 39 forming the essential parts of the sash guiding system. The lower cross beam 27 is connected by a pitman (connecting rod) 41 to a crank pin 43 upon the main drive shaft 11, whereby the sash 23 is reciprocated up and down when said shaft is turned. A log which should be cut up into boards is fed horizontally by means of feed rolls 47 towards and past the saw blades in a continuous uniform motion, the speed of which preferably being variable.

According to the invention, the sash guiding system comprising the columns 37, 39 is movable in synchronism with the sash and is arranged to perform a motion parallel to itself and having a vertical component and a horizontal component. To that end, on both sides of the sash and above as well as below the sash the sash guiding system is provided with sliding blocks which are guided in stationary slide chutes secured to the framework of the machine. Thus the upper end of the column 37 is pivoted to a slide block 49 which runs in a slide chute 51, and its lower end is pivoted to a sliding block 53 running in a slide chute 55. Pivoted to the slide block 53 is also the upper end of a pitman 57 which cooperates with a crank disk 59 eccentrically attached to the main drive shaft 11. The pitman 57, the column 37 and the centre planes of its slide blocks are located in the same vertical plane. When the shaft 11 turns, the column 37 and its guiding slide blocks are put in a reciprocating motion up and down. The column 39 is guided in the same manner as the column 37 and is driven by a similar pitman 61. All four sliding chutes are somewhat oblique to the vertical and are mutually parallel. Therefore, the sash guiding system 37, 39, 49, 53, 67, 69 moves as a solid unit, all parts thereof describing similar straight and parallel paths. Preferably, the angle to the vertical or to the length direction of the columns 37, 39 is of the order of 4 to 20 degrees, but may be smaller or even larger dependant upon the length of the stroke of the pitmans 57, 61. According to a modification the columns 37, 39 may be rigidly connected to each other by cross beams or similar, in which case the sash guiding system may be driven by a single pitman pivoted to an intermediate point of the lowermost cross beam.

The sliding chutes 51, 55 may be firmly and immovably attached to the machine framework 21, but preferably their inclination to the vertical is made variable in order to suit changed working conditions of the saw. To that object the chutes are formed in supporting members 63, 65, 67 and 69 which may be swung a small angle about pins 71 held by brackets upon the framework of the machine. A projecting lever 72 upon the supporting member 63 is connected by means of a rod 73 to a corresponding lever 75 upon the slide chute supporting member 65. A corresponding rod 77 serves to connect levers 79, 81 projecting from the slide chute supporting members 67 and 69, respectively. The levers 75 and 81 are connected to each other by means of a horizontal bar 83. Thus, all slide chute supporting members are interconnected so that they always keep their slide chutes parallel, irrespectively of the magnitude of their inclination to the vertical.

Pivotally connected to the centre of the bar 83 is the upper end of a piston rod 84 of a hydraulic cylinder 85, the lower end of which is pivotally connected to the framework of the machine. By supplying pressure fluid to one or the other end of said cylinder 85 all slide chute supporting members can be adjusted in common and their slide chutes be given the desired inclination. Said adjustment may be performed either manually or automatically in a manner not described in detail and in dependance upon the feed rate of the rolls 47.

The point of the crank disk 59 most remote from the axis of the shaft 11 is located on a radius displaced in the direction of rotation with an angle of the order of 30 to 60 degrees, preferably about 45 degrees, from the radius on which the crank pin 43 is located. Therefore, the reciprocating motion of the sash guiding system will be phase-displaced relatively to the reciprocating motion of sash. The consequence thereof is that when the sash during the performance of its downwardly directed sawing stroke, has reached the position shown in FIG. 1, the pitmans 57, 61 have already started to push the sash guiding system upwardly, thereby displacing the latter horizontally in the direction of the feed of the log as a result of the cooperation of the slide blocks and the inclined slide chutes. Via the guide sleeves 35 said horizontal motion is transferred to the sash 23, so that the same retracts the saw blades from the bottom of the cuts made in the advancing log. During the following inactive upward return stroke of the sash the same is first further displaced in the direction of feed of the log, so that the backs of the saw teeth do not contact the log. At the end of said return stroke the horizontal movement of the sash is reversed and the sash is displaced oppositely to the advancing log, so that already at the very start of the following downward sawing stroke of the sash the saw blades are returned to the bottom of the cuts to continue their sawing action.

The embodiment shown in FIGS. 3 and 4 corresponds in the general build-up to the one just described and the same reference numerals have been applied to corresponding details. However, it is modified in respect of the attachment and guidance of the sash guiding system. The guide columns 37, 39 are not, as in FIGS. 1 and 2, pivoted to rectilinearly guided members (i.e. the slide blocks 49, 51, 53, 55), but are instead pivoted to the ends of rocker arms 87, 89, 91 and 93, which serve to guide the sash guiding system in a path slightly curved in the shape of a circular arc but which path everywhere forms a comparatively small angle to the vertical, so that the motion of the saw sash is substantially the same as in the embodiment of FIGS. 1 and 2. The two upper rocker arms 87, 89 are pivotally suspended upon an upper transverse horizontal bar 95, and the lower rocker arms 91, 93 are pivotally suspended upon a lower bar 97 parallel to the bar 95. All rocker arms are equally long and are inclined with the same slight angle to the horizontal plane. When the two pitmans 57, 61 which are pivotally connected to the swinging ends of the lower rocker arms, cause the guide columns 37, 39 to perform a reciprocating motion, all rocker arms perform swinging motions in vertical planes parallel to each other and to the direction of feed of the log, the columns 37, 39 being kept truly vertical while moving as a unit in a mainly vertical path having a small horizontal component. The magnitude of said component is dependant upon the inclination of the rocker arms. In order to vary said inclination as desired and thereby also the magnitude of the horizontal movement of the sash, the bars 95, 97 are adjustable in the vertical direction by means of a common mechanism subjecting them to equally great and equally directed displacements. Said mechanism consists of a horizontal control shaft 99 which is coupled by means of bevelled gears to two vertical shafts 101, 103. Each of said shafts has an upper threaded part upon which a threaded sleeve 103 is placed, and a lower threaded part upon which a threaded sleeve 107 is placed. The bar 95 is secured to the upper threaded sleeves, and the bar 97 is secured to the lower threaded sleeves. When the control shaft 99 is turned, all threaded sleeves are displaced equally far, the bars 95, 97 being raised or lowered while maintained horizontal, and the inclination of all rocker arms being changed while retaining their parallel relationship.

The above-described embodiments are merely examples, and the details thereof may be modified in various respects without departing from the scope of the invention as set forth in the following claims. According to one modification, the path (either rectilinear or curved) of the sash guiding system is inclined relatively to the vertical transverse plane in the direction opposite to that shown in the drawings. Then the direction of motion imparted by the pitmans 57, 61 must be reversed which can be made by locating the top points of each crank disk 59 on a radius which, instead of leading in the rotation by 45 degrees over the radius of the crank pin 43, lags the same by 135 degrees. Other modifications may concern each pair of two slidingly cooperating members, of which either member may be the one embracing the other and the surfaces of sliding engagement may be changed from being plane to being cylindrical, and vice versa.

I claim:

1. A gang saw for cutting horizontally fed timber, in which a main drive shaft by means of a crank reciprocates a sash carrying saw blades, relatively to a sash guiding system by means of which the sash when approaching its lower turning point, is given a slight motion in the direction of feed of the timber, characterised in that the sash guiding system is driven by means of a crank and pitman drive directly from the main drive shaft in an essentially vertical reciprocating motion that is phase-displaced relatively to the vertical reciprocating motion of the sash, and in that the sash guide system is itself guided in a path which is mainly vertical but forms a comparatively small angle to the path in which the sash guiding system guides the sash.

2. A gang saw as claimed in claim 1, characterised in that the sash guiding system is guided by four straight slide chutes which are located in pairs on opposite sides of the sash and above and below the same and which form the same angle to the vertical.

3. A gang saw as claimed in claim 2, characterised in that the sash guiding system comprises two similar vertically extending sash guiding members, the upper end of either one being provided with a slide block cooperating with an upper slide chute and the lower end of either one being provided with a slide block cooperating with a lower slide chute.

4. A gang saw as claimed in claim 3, characterised in that the slide chutes are formed in supporting members which are pivotally connected to the stationary framework and are adjustable, whereby all chutes may be set simultaneously in the same desired angle to the vertical.

5. A gang saw as claimed in claim 4, characterised in that the control member for adjusting the angle of the chute supporting members is connected to manually operable means for adjusting the feed rate of the timber.

6. A gang saw as claimed in claim 3, characterised in that all slide blocks are pivoted to their pertaining sash guiding member.

7. A gang saw as claimed in claim 3, characterised in that each sash guiding member is pivotally connected to a separate pitman driven by the main drive shaft, each sash guiding member and the pertaining pitman being positioned in the same vertical plane.

8. A gang saw as claimed in claim 1, characterised in that the phase displacement between the pitman operating the saw sash and the pitman or pitmans operating the guide system, is of the order of 30 to 60 degrees, preferably about 45 degrees.

9. A gang saw as claimed in claim 1, characterised in that the sash guiding system is suspended by four similar rocker arms forming the same comparatively small angle to the horizontal and pivoted to the framework of the saw, whereby the sash guiding system is mounted for a parallel movement in an arc-shaped path.

10. In a sawing machine, a stationary framework, a rotary drive shaft, a gang of saw blades, a sash carrying said saw blades, a guiding system for supporting said sash and defining a substantially vertical path thereof, a crank and a pitman connecting said shaft to said sash for reciprocating the sash relatively to said sash guiding system, stationary guide means for supporting said sash guiding system and defining a substantially vertical path thereof forming a slight angle to the first-mentioned path, and a second crank and a second pitman connecting said shaft to said sash guiding system for reciprocating the same relatively to said stationary framework in said lastmentioned path, said second crank and said second pitman being angularly off-set relatively to said first-mentioned crank and pitman so as to effect a reciprocation of the sash guiding system that is synchronous to but phase-displaced relatively to the reciprocation of the sash.

11. A sawing machine as claimed in claim 10, in which said stationary guide means is adjustable so as to change the inclination of the path guiding the reciprocating sash guiding system.

12. In a gang saw, a vertically reciprocating saw-carrying sash, two parallel vertical columns slidingly supporting said sash, four slide blocks each connected to a separate one of the upper and lower ends of said columns, four slide ways each guiding a separate slide block in a path forming a slight angle to the vertical, and means for reciprocating said columns and said slide blocks relatively to said slide ways.

No references cited.

DONALD R. SCHRAN, *Primary Examiner.*